United States Patent
Tellado et al.

(10) Patent No.: US 10,742,482 B2
(45) Date of Patent: Aug. 11, 2020

(54) CLUSTERING EVENT RECORDS REPRESENTING ANOMALOUS EVENTS

(71) Applicant: HEWLETT PACKARD ENTERPRISE DEVELOPMENT LP, Houston, TX (US)

(72) Inventors: Jose Tellado, Santa Clara, CA (US); Bernd Bandemer, Santa Clara, CA (US); Susmita Ghose, Santa Clara, CA (US); Gunes Kayacik, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/904,489

(22) Filed: Feb. 26, 2018

(65) Prior Publication Data

US 2019/0268215 A1  Aug. 29, 2019

(51) Int. Cl.
*H04L 12/24* (2006.01)
*H04W 24/04* (2009.01)

(52) U.S. Cl.
CPC ........ *H04L 41/0613* (2013.01); *H04L 41/069* (2013.01); *H04L 41/0672* (2013.01); *H04L 41/142* (2013.01); *H04L 41/22* (2013.01); *H04W 24/04* (2013.01)

(58) Field of Classification Search
CPC ............. H04L 41/0613; H04L 41/0672; H04L 41/142; H04L 41/22; H04L 41/04; H04W 24/04; G06N 99/005; G06N 5/02; G06F 11/079; G06F 11/0721
USPC ........................................................ 370/216
See application file for complete search history.

(56) References Cited

U.S. PATENT DOCUMENTS

| | | | | |
|---|---|---|---|---|
| 2016/0342903 | A1* | 11/2016 | Shumpert | G06F 11/079 |
| 2018/0024901 | A1* | 1/2018 | Tankersley | G06Q 10/06393 |
| | | | | 707/694 |
| 2018/0165142 | A1* | 6/2018 | Harutyunyan | G06F 11/079 |

OTHER PUBLICATIONS

Arias-Castro et al., Detection of an Anomalous Cluster in a Network, electronic reprint of the original article published by the Institute of Mathematical Statistics in the Annals of Statistics, 2011, vol. 39, No. 1, 278-304.
Cai et al., Interactive Visualization of Network Anomalous Events, ICCS 2009 (10 pages).
Pawling et al., Anomaly Detection in a Mobile Communication Network, 2007 (17 pages).
Weerathunga, Ashen, [Article] Anomaly Detection Using K-Means Clustering, Library (/library), Jan. 2016 (19 pages).
Zhang et al., Detection and Classification of Anomalous Events in Water Quality Datasets Within a Smart City-Smart Bay Project, 2014 (12 pages).

* cited by examiner

*Primary Examiner* — Yemane Mesfin
*Assistant Examiner* — Intekhaab A Siddiquee
(74) *Attorney, Agent, or Firm* — Trop, Pruner & Hu, P.C.

(57) ABSTRACT

In some examples, a system generates event records representing anomalous events associated with respective devices in a network, each respective anomalous event of the anomalous events being identified as anomalous for a respective context of a device of the devices. The system clusters the event records to produce a plurality of clusters of the event records. The system outputs the plurality of clusters for application of a remediation of an issue in the network.

19 Claims, 6 Drawing Sheets

CLUSTERING EVENT RECORDS REPRESENTING ANOMALOUS EVENTS

BACKGROUND

Wireless electronic devices are able to move around to different locations in a network. The network includes access nodes at multiple locations to which wireless electronic devices are able to establish wireless connectivity. Once a wireless electronic device establishes a wireless connection with an access node, the wireless electronic device is able to perform communications with another endpoint device through the network.

BRIEF DESCRIPTION OF THE DRAWINGS

Some implementations of the present disclosure are described with respect to the following figures.

Figure 1:
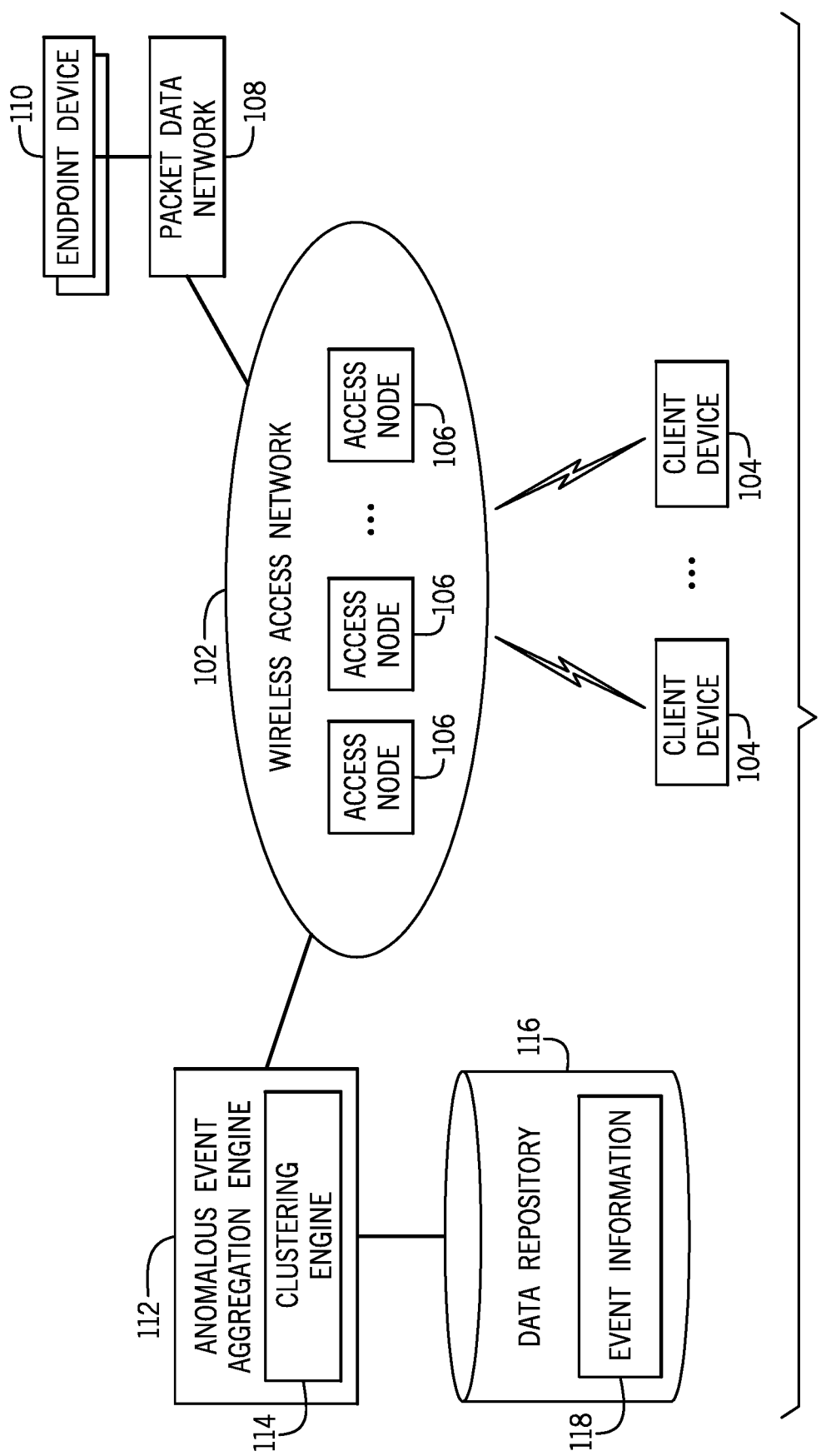
FIG. 1 is a block diagram of an arrangement including a network and an anomalous event aggregation engine, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Different types of wireless networks can include different types of access nodes to which wireless electronic devices are able to establish wireless connectivity. In a wireless local area network (WLAN), such as a Wi-Fi network that operates according to the Institute of Electrical and Electronics Engineers (IEEE) 802.11 standards, access nodes include access points (APs). In cellular networks, access nodes include base stations that provide respective coverage areas in cells. An example cellular network can operate according to the Long-Term Evolution (LTE) standards as provided by the Third Generation Partnership Project (3GPP). The LTE standards are also referred to as the Evolved Universal Terrestrial Radio Access (E-UTRA) standards. In other examples, cellular networks can operate according to other protocols, such as a Global System for Mobile (GSM) protocol, an Enhanced Data rates for GSM Evolution (EDGE) protocol, a Universal Terrestrial Radio Access Network (UTRAN) protocol, a Code Division Multiple Access (CDMA) 2000 protocol, and so forth. In further examples, cellular networks can be fifth generation (5G) or beyond cellular networks.

Other types of access nodes can be used in other types of networks. Generally, an access node is a network device that a wireless electronic device can establish a wireless connection with to allow the wireless electronic device to communicate with another endpoint device over a network to which the access node is connected.

Examples of wireless electronic devices include any or a combination of: a notebook computer, a tablet computer, a smartphone, a game appliance, a wearable device (e.g., a smart watch, smart eyeglasses, a head-mounted device, etc.), a vehicle, and so forth. Wireless electronic devices that are able to establish network connectivity with access nodes are also referred to as client devices.

Network monitoring can be performed in a network to monitor various operational aspects in the network. For example, the network monitoring can monitor various parameters, such as a data rate, an amount of data transmitted or received, a connection failure indication, a signal-to-noise (SNR) ratio, information of a received signal, a received noise or interference metric, retry information, a channel occupancy metric, information associated with other access nodes in the neighborhood, information of a client device, an application type, a response time metric, information of an access node, and so forth. Based on the monitored parameters, a determination can be made of whether issues are present in the network that are to be addressed.

A parameter can be measured, obtained, or inferred by a device (a client device and/or an access node). Measurement of a parameter can be accomplished using sensors or monitoring agents deployed in various devices that are able to communicate in a network. Alternatively or additionally, a parameter can be obtained from a data repository that stores parameters previously acquired by devices. Further, a parameter can be inferred by a device by computing a value of the parameter based on input information, such as another measured parameter and/or parameter obtained from a data repository.

In a large network, a massive amount of data may be collected by the network monitoring. The collected data can be multidimensional with a large number of dimensions, where the dimensions represent respective parameters. In analyzing the collected data, focusing on just one dimension of the multidimensional data may not produce a desired insight into aspects of a network, including any issues that may arise in the network. Additionally, the collected data can indicate false alarms or other events that are not relevant to issues that may arise in the network arrangement. Examples of issues include failure of a hardware component or failure or fault of machine-readable instructions, an overloading of a component, a malware infection of a component, a security intrusion at a component, and so forth.

In order to obtain relevant insights of multidimensional data collected by network monitoring, techniques or mechanisms according to some implementations of the present disclosure can generate event records (e.g., in the form of event vectors) with relevant dimensions, which can then be clustered to produce clusters that aggregate events to allow for a derivation of the insights that may pertain to issues present in a network.

FIG. 1 is a block diagram of an example arrangement that includes a wireless access network 102 to which various client devices 104 are able to connect. The wireless access network 102 can be a WLAN that operates according to the IEEE 802.11 standards. Alternatively, the wireless access network 102 can be a cellular network or other type of wireless network. The wireless access network 102 includes various access nodes 106. Each access node 106 has a respective coverage area. If a client device 104 is within the coverage area of a particular access node 106, then the client device 104 is able to establish a wireless connection with the particular access node 106.

Once a client device 104 establishes a wireless connection with an access node 106, the client device 104 can perform communications through the wireless access network 102 with a packet data network 108, or other type of network. For example, the packet data network 108 can include a public network such as the Internet. Alternatively, the public packet network 108 can include a local area network (LAN) or a wide area network (WAN) of a particular enterprise, such as a company, an educational organization, a government agency, or an individual.

Endpoint devices 110 can be connected to the packet data network 108. The endpoint devices 110 can include any or some combination of the following: user devices, server computers, storage systems, and so forth.

In accordance with some implementations of the present disclosure, an anomalous event aggregation engine 112 performs aggregation of anomalous events that can produce clusters of event records, where the clusters can be output for application of a remediation of an issue in a network. Clustering of event records can be performed by a clustering engine 114, which is shown as being part of the anomalous event aggregation engine 112. In other examples, the clustering engine 114 can be separate from the anomalous event aggregation engine 112.

An "engine" can refer to a hardware processing circuit, which includes any or some combination of the following: a microprocessor, a core of a multi-core microprocessor, a microcontroller, a programmable integrated circuit device, a programmable gate array, or any other type of hardware processing circuit. Alternatively, an "engine" can refer to a combination of a hardware processing circuit and machine-readable instructions executable on the hardware processing circuit.

Various parameters can be measured, obtained, or inferred based on monitored information in the network. The parameters are detected as part of events in the network. Events can include events relating to establishing a connection between a client device 104 and an access node 106, events relating to data transfer between a client device 104 and an access node 106, events relating to a termination of a connection between a client device 104 and an access node 106, and so forth.

The parameters collected as part of events can be included in event information. In some examples, the event information can be stored as event information 118 in a data repository 116 accessible by the anomalous event aggregation engine 112. The data repository 116 can be implemented using a storage device or an arrangement of multiple storage devices. In other examples, event information can be received in real-time for processing by the anomalous event aggregation engine 112.

Figure 2:
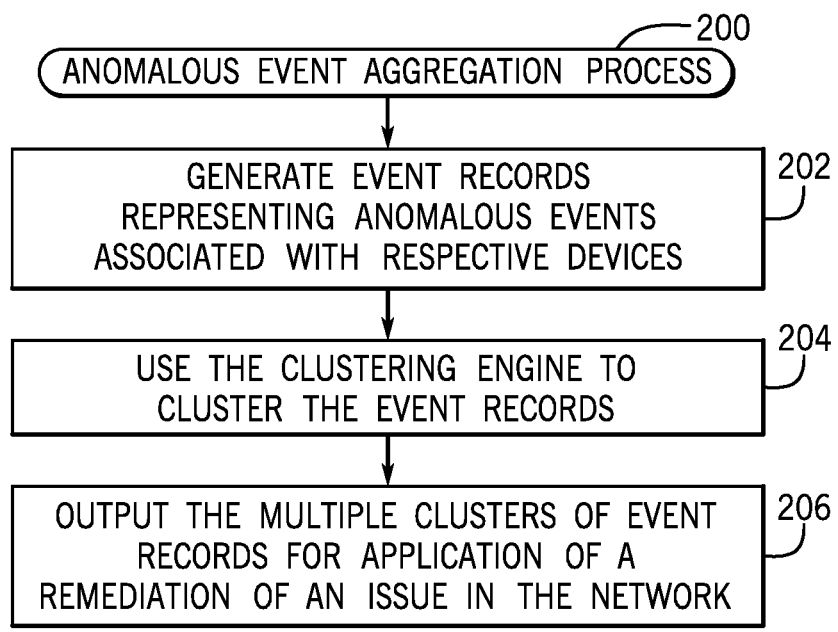
FIG. 2 is a flow diagram of an anomalous event aggregation process according to some examples.

FIG. 2 is a flow diagram of an anomalous event aggregation process 200 performed by the anomalous event aggregation engine 112 according to some examples. The anomalous event aggregation engine 112 generates (at 202) event records representing anomalous events associated with respective devices, where the devices can include access nodes 106 and/or client devices 104. In some examples, an event record can be in the form of an event vector that has multiple dimensions, where each dimension represents a respective parameter that has been detected (i.e., measured, obtained, or inferred).

As noted above, example parameters include any or some combination of the following: a data rate, an amount of data transmitted or received, a connection failure indication, a signal-to-noise ratio (SNR), information of a received signal, a received noise or interference metric, retry information, a channel occupancy metric, information associated with other access nodes in the neighborhood, information of a client device, an application type, a response time metric, information of an access node, and so forth.

A data rate can be expressed as a number of bytes or bits (or other measure of an amount of data) transferred per unit time. An amount of data transmitted or received can be expressed as a number of bytes or bits or other measure of data amount. In examples where a wireless link between client devices 104 and an access node 106 includes multiple channels, the data rate or amount of data can be determined per channel.

A connection failure indication includes information indicating that a connection attempted by a client device 104 of an access node 106 failed. The connection failure indication can also include a reason code to indicate a reason for the failure.

An SNR provides an indication of a ratio of a magnitude (e.g., power) of a useful signal (that carries data or other information) to a magnitude (e.g., power) of noise.

Information of a received signal can include information identifying a signal received by a client device 104 or access node 106.

A received noise or interference metric provides an indication of a level of noise or interference between signals.

Retry information can indicate a number of retries or a rate of retries in response to a failed attempt at establishing a connection, transferring data or other information, and so forth.

A channel occupancy metric indicates utilization of a channel in a wireless link (e.g., an amount of loading of the channel).

Information associated with other access nodes in the neighborhood includes information identifying channels of neighboring access nodes, identities of neighboring access nodes, and so forth.

Information of a client device includes a type of the client device (e.g., a notebook computer, a smartphone, a tablet computer, etc.), a device model of the client device (e.g., an iPhone device, a Galaxy device, etc.), a mobility of the client device (e.g., whether the client device is stationary, slow moving, or fast moving), and so forth.

An application type identifies a type of application (executed in a client device 104 or access node 106) that performed an action giving rise to an event.

A response time metric provides an indication of a response time of a device to an input event, such as a message or data.

Information of an access node includes a type of the access node, a device model of the access node, and so forth.

Each respective anomalous event is identified as anomalous for respective context of a device, whether an access node or a client device. Different devices can operate in different contexts, such as operation in different deployment environments, operation with different settings, and so forth. A context of a device can also be based on the type of device (e.g., a smartphone, a tablet computer, a notebook computer, a specific device model of the device, etc.). Different types of devices have different operational features, so that an event may be considered anomalous for a first type of device but not for a second, different type of device.

An event may be anomalous for one context but may not be anomalous for a different context. Thus, in generating the event records representing anomalous events, the events are first identified as anomalous for a context of a respective device, and only parameters of anomalous events are included in the event records. Events that are not identified as anomalous are not included in the event records.

A deployment environment of an access node 106 can refer to a physical environment where the access node is deployed. The physical environment can include an indoor environment (e.g., within a house, a building, etc.) or an outdoor environment (e.g., outside a house, a building, etc.). The deployment environment can also refer to the type of environment used to deploy the access node, such as a dormitory, a school, a retail outlet, a work environment, a home, and so forth.

Access nodes 106 used in different environments can exhibit different signal propagation characteristics. An access node used in an outdoor environment may have less obstacles to signal propagation or different obstacles (e.g., trees, buildings) to signal propagation than an access node used in an indoor environment (where walls and furniture, for example, may interfere with signal propagation). Thus, an event that may be anomalous for an outdoor access node may not be anomalous for an indoor access node.

Client devices 104 can also have different deployment environments, including an outdoor environment, indoor environment, and so forth, such as those listed above. For client devices 104 that are mobile, the mobility of the client devices 104 can cause them to be in different deployment environments at different times.

Devices (access nodes 106 and/or client devices) can also have different settings that affect respective operations of the devices. For example, a setting can define a transmission power of the device. A higher transmission power setting means that the device can transmit a wireless signal at a higher power. Other settings include a gain setting (which controls a gain of a receiver in a device), a discontinuous reception (DRX) setting (which controls time durations when a receiver of a device is on and off), and so forth. Whether or not an event is anomalous for a device can depend upon the setting of the device. For example, if the device has a high transmission power setting, then it would be expected that the SNR for the device should be higher than for a low transmission power setting.

The anomalous event aggregation engine 112 uses the clustering engine 114 to cluster (at 204) the event records. Clustering the event records produces a multiple clusters of event records. The anomalous event aggregation engine 112 outputs (at 206) the multiple clusters of event records for application of a remediation of an issue in the network. The remediation applied to an issue can be applied by a human or applied by an automated entity such as a machine or a program (in the form of machine-readable instructions). For example, if the issue relates to failure or fault of a component (hardware or machine-readable instructions), then the remediation can include resetting the component, disabling the component, powering off the component, and so forth. If the issue relates to a malware infection or a security intrusion at a component, then the remediation can include a malware scanning process or other security measure can be initiated to address the malware infection or the security intrusion. If the issue relates to overloading of a machine, then the remediation can include stopping a process at the machine or transferring a process from the machine to another machine.

Figure 3:
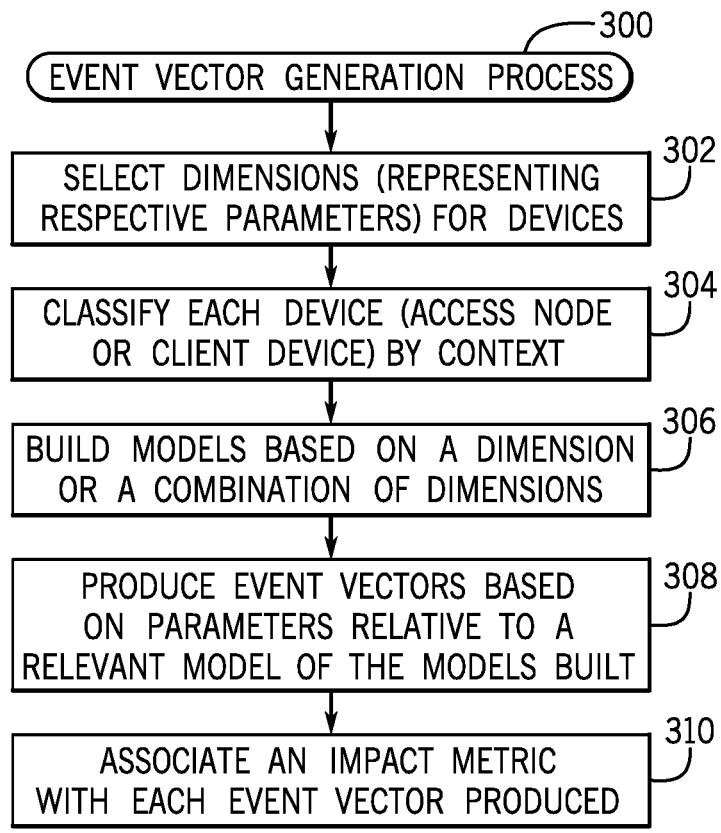
FIG. 3 is a flow diagram of an event vector generation process, according to some examples.
Figure 4:
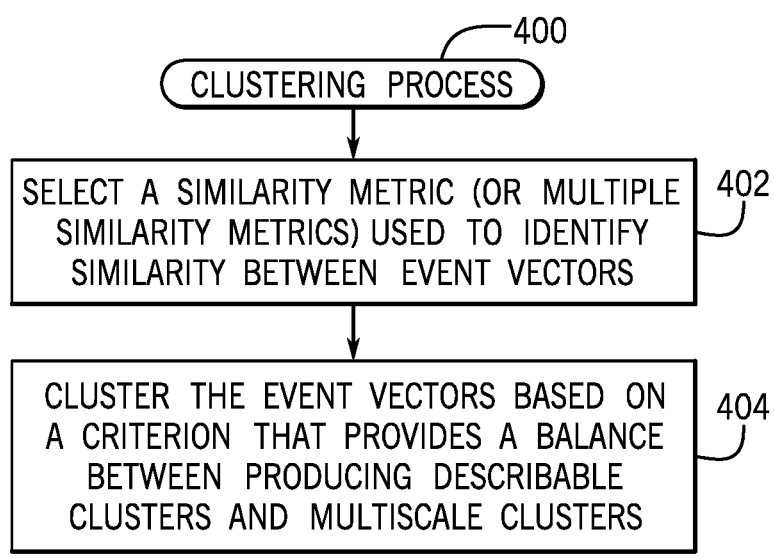
FIG. 4 is a flow diagram of a clustering process according to some examples.

FIG. 3 is a flow diagram of an event vector generation process 300 of generating event vectors (an example of generating event records at 202 in FIG. 2). The event vector generation process 300 can be performed by the anomalous event aggregation engine 112 in some examples.

The event vector generation process 300 selects (at 302) dimensions (representing respective parameters) for devices (access nodes and/or client devices). The selecting of the dimensions can be based on user input (e.g., selection by a network administrator) or can be automatically performed by an automated entity (a machine or program). The dimensions selected can be those that have been determined from past experience or from machine learning are more indicative of target network issues than other (non-selected) dimensions.

The event vector generation process 300 classifies (at 304) each device (access node or client device) by context, based on any or a combination of a device type, a deployment environment of the device, and a setting of the device.

The event vector generation process 300 builds (at 306) models based on a dimension or a combination of dimensions. A model can include a representation of an expected distribution of values of a given parameter or set of parameters (e.g., SNR, response times, retry information, etc.) at different physical locations, different times, and so forth. The building of the model can be based on historical data collected in the network. Different models can be provided for different contexts of devices, based on the classifying of devices (at 304). For example, a first model can be built for a first type of access node or an access node in a first deployment environment or having a first setting, a second model can be built for a second type of access node or an access node in a second deployment environment or having a second setting, and so forth.

The event vector generation process 300 produces (at 308) event vectors based on parameters relative to a relevant model of the models built (at 306). The event vectors represent events identified as anomalous based on the relevant model. The parameters of each event vector can be compared to the relevant model to determine whether the event vector is representative of an anomalous event. For example, if a particular parameter or particular combination of parameter of the event vector has value(s) that fall(s) outside respective expected range(s) based on the relevant model, then the event vector can be included as part of the event vectors produced (at 308).

In some examples, the anomalous event aggregation engine 112 can determine, based on identified clusters, that a model of the models is inaccurate. For example, if events are identified as anomalous where they should not have been, then a model may be updated to address the incorrect identification of anomalous events.

In some examples, the event vector generation process 300 can also associate (at 310) an impact metric with each event vector produced (at 308). An impact metric provides a measure of a potential impact that the event vector may have on a network issue. For example, an event vector having a parameter with a value that exceeds or falls below a specified threshold (e.g., SNR that is below an SNR threshold) may have an impact metric with a value indicating that the event record may have a higher impact on a network issue than another event vector having a parameter with a value that does not exceed or fall below the specified threshold (e.g., SNR that is above the SNR threshold).

The following provides an explanation of examples of a clustering process 400 (an example of the clustering at 204 in FIG. 2) that can be performed by the clustering engine 114 for clustering event vectors. The clustering process 400 selects (at 402) a similarity metric (or multiple similarity metrics) used to identify similarity between event vectors. The clustering of the event vectors are those event vectors that are similar in one or multiple characteristics (e.g., geographic location, connected access node, etc.).

The clustering process 400 clusters (at 404) the event vectors based on a criterion that provides a balance between producing describable clusters and multiscale clusters.

The size (or density) of clusters can be a parameter to optimize when forming clusters. A descriptiveness of clusters can also be another parameter to optimize. Multiscale clusters refer to clusters of different sizes. Describable clusters refer to clusters that are descriptive of a characteristic (or characteristics) represented by the event records in the describable clusters.

One example option is to choose clusters such that there are more descriptive dimensions (parameters), to produce describable clusters. For example, if each event vector has 10 dimensions, but a criterion specifies that 7 of the dimensions be descriptive (i.e., there are 7 dimensions in common between the event vectors in the cluster or 7 dimensions that are very concentrated, such as an SNR parameter having values in a narrow range of SNR values), then the clustering can produce clusters of event records that share more dimensions in common or event records with parameter values within a tight range.

In one example, a dimension can be considered descriptive for a cluster because its values are concentrated in a narrow range or a small set. For example, consider a network in which 50% of the client devices are device type A and 50% are device type B. Consider a cluster that includes 99% events from device type A and 1% from device type B. The device type dimension of this cluster can be considered descriptive, because it is concentrated on device type A. The statement "device type=A" is descriptive for the cluster because the probability P(device type=A|cluster) is large. In other words, the purity of device type A in the cluster is large.

In another example, a dimension can be considered descriptive for a cluster because the dimension's values have a low probability with respect to the underlying population. For example, consider a network in which 1% of the client devices are device type A and 99% are device type B. Consider a cluster that includes 50% events from device type A and 50% from device type B. The device type dimension of this cluster can be considered descriptive, because device type A has very low probability in the population, but large probability in the cluster. The statement "device type=A" is descriptive for the cluster because the probability P(device type=A|cluster) conditioned on the cluster is much larger than the unconditional P(device type=A). In other words, the probability boosting factor of device type A in the cluster is large.

In another example, a dimension can be considered descriptive for a cluster because of a combination of purity and probability boosting.

More generally, a describable cluster includes event vectors that share a larger number of dimensions or that share parameter values in a tight range, which allows for a characteristic of the cluster to be more readily ascertained. Shared dimensions refer to dimensions in the respective event clusters that have similar values (i.e., dimension values that are within a specified similarity threshold of one another). The shared dimensions determine what is characteristic about the cluster, i.e., what all the event vectors in the cluster have in common. For example, a cluster may be concentrated in the location and time dimension, but not in the device type dimension, which may mean that in a certain building at a certain time, many different types of devices had network problems. The root cause is likely not related to the device type, but may be related to an interferer that turned on at that particular time in that particular building.

In other cases, a cluster may include event vectors that have a smaller number of dimensions in common, and the cluster can be big (with many event vectors), but the cluster can still be descriptive. For example, all access nodes of a specific version have a bug for a specific software version. This cluster may only have two dimensions in common (access node version and software version), but is still descriptive enough to be considered a describable cluster.

In further examples, smaller clusters may be useful because they are very specific (i.e., they share more dimensions), thus making it easier to identify root causes. Larger clusters may be useful because they correspond to widespread issues that happen across the board (for example, a wireless controller update introduced a bug that affects an entire campus).

A tradeoff can be made where less descriptive clusters should be set to have bigger sizes relative to more descriptive clusters. A tradeoff can be made where a smaller number of less descriptive (and larger) clusters are maintained relative to more descriptive clusters. Another tradeoff can be made where the less descriptive clusters may be significantly different from the more descriptive clusters (e.g., to avoid a less descriptive cluster including a more descriptive cluster).

In further examples, the clustering of event vectors produces clusters each including event records representing events exhibiting a respective pattern, and excluding uncorrelated events. Uncorrelated events can refer to events that are not related to other events. For example, a first event is not related to a second event if a measure of similarity between the first and second events (such as based on values of the dimensions of the event records representing the first and second events) is less than a similarity threshold. An uncorrelated event can include an event that is one-off or occurs because of random coincidence, for example. Events exhibiting a pattern are those events that are similar with respect to one another according to a similarity criterion, such as based on a measure of similarity.

After a cluster is formed, the distance between events (based on event similarity or descriptive dimensions) of the cluster can be used to separate related events from less related events (so called "uncorrelated events"). For example a cluster based on an access node version and software version may include other events that share dimensions such as channel, band, connectivity failure code, physical proximity to events in the cluster, but do not share the two descriptive dimensions (access node version and software version). Such other events can be removed from the cluster. In another example, a centroid or medoid can be computed for each cluster, by taking the mean or median of each dimension. Events with distance less than a threshold from the centroid/medoid are considered the core of the cluster, while events that are further from the centroid/medoid are considered the fringe of the cluster. Fringe events can be removed from the cluster, as they may originate from background noise instead of a desired pattern that underlies the cluster. In another example, the core of a cluster can be distinguished from the fringe of the cluster by a threshold on the event density instead of a threshold on the distance from the centroid/medoid. The event density is the appropriately smoothed estimated number of events per unit volume in the feature space.

Figure 5:
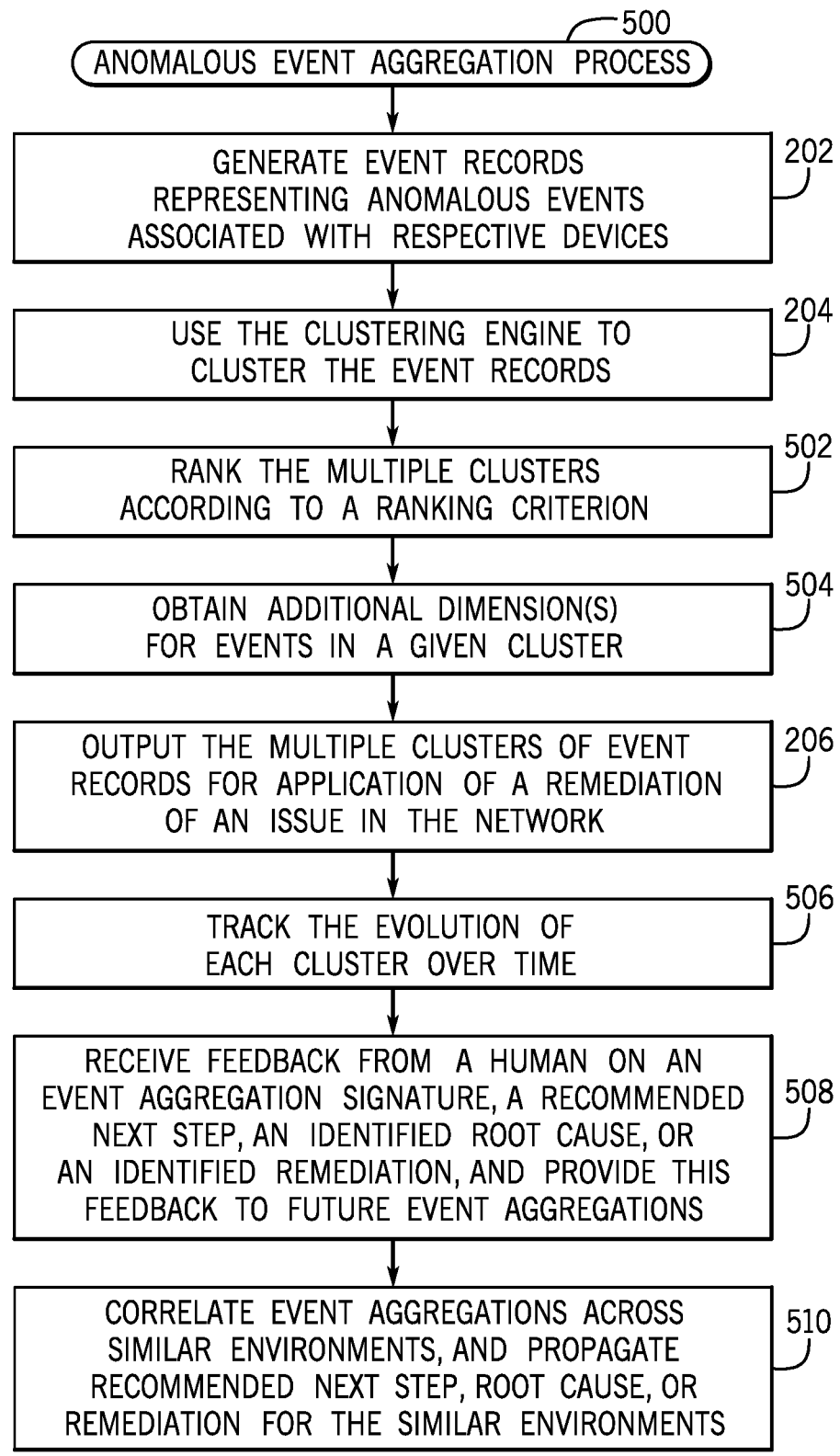
FIG. 5 is a flow diagram of an anomalous event aggregation process according to further examples.

FIG. 5 is a flow diagram of an anomalous event aggregation process 500 performed by the anomalous event aggregation engine 112 according to further examples. The anomalous event aggregation process 500 includes the tasks 202, 204, and 206 of FIG. 2.

In addition, after clustering (at 204) the event records to produce multiple clusters, the anomalous event aggregation process 500 ranks (at 502) the multiple clusters according to a ranking criterion. The ranking criterion can include a criterion specifying that ranking among the clusters takes into account multiple dimensions, such as an event count (number of event records) for each cluster, an average severity of events (such as indicated by the impact measure noted above) in each cluster, a density of events in the cluster (e.g., a number of events within a specified time interval or a specified physical space), a history of the cluster (e.g., whether the cluster is a newly discovered cluster or has been previously identified and is representative of a persistent issue).

The ranking of the clusters can also include generating an intra-cluster metric that is used to determine how closely arranged or spread apart events are in each given cluster. A cluster that includes events that are closely arranged together is indicative of a purity of the cluster. The most closely arranged events of a cluster, that is indicative that the cluster includes a larger number of similar events and thus represents a corresponding characteristic(s) that may more readily be correlated to a network issue. A cluster with spread apart events indicates a less pure cluster that has less similar events and thus may not be readily correlated with a network issue.

Alternatively or additionally, the ranking of the clusters can also include generating an inter-cluster metric used to determine how similar clusters are to one another. The inter-cluster metric can be based on a subset of dimensions of event records included in multiple clusters. Two clusters that share similar event records can be considered to be more similar to one another.

The anomalous event aggregation process 500 can further obtain (at 504) additional dimension(s) for events in a given cluster. The additional dimension(s) can include an additional parameter(s) and/or an additional description of a cluster.

In some examples, the additional dimension(s) can be used to sub-cluster the given cluster. The events of the given cluster can be partitioned into multiple sub-clusters based on values of the additional dimension(s).

The additional dimension(s) can also be used to produce additional detail information relating to the given cluster, where the additional detail information can include an aggregate (e.g., sum, average, etc.) of the additional dimension(s) of the events in the given cluster, an explanation or hint regarding the events in the given cluster, a next step to perform for a network issue indicated by the given cluster, a root cause of a network issue indicated by the given cluster, a remediation action to perform, and so forth.

Outputting (at 206) clusters can include displaying the clusters in a user interface, e.g., a graphical user interface, on a display device. The ranking of the clusters can be used to display the clusters. For example, higher ranked clusters can be displayed more prominently (e.g., with a larger size graphical representation or a more colorful representation). As another example, lower ranked clusters may be omitted from the display.

Also, clusters that are determined to be more pure (based on the intra-cluster metric) can be ranked higher and displayed more prominently.

For clusters that are determined to be similar to one another based on the inter-cluster metric, just one of the similar clusters can be displayed. Alternatively, clusters determined to be similar to one another can be combined or aggregated into one cluster. By selecting clusters for display that are not similar to one another, more unique clusters (or clusters that are more different from other clusters) can be presented to a user.

In further examples, to decide if a cluster is interesting to display, the distances or similarities of events within the cluster can be used as a metric. To decide if a first cluster is interesting relative to a second cluster, the distance (or similarity) between the events of the first cluster can be compared to the distance (or similarity) between the events of the second cluster. Alternatively the distance in descriptive dimensions can be used.

In some examples, clusters can be displayed in the form of a table, where each cluster is described by its characteristic dimensions. Alternatively, the spatial distribution of events in a cluster can be displayed in a map or a floor plan. As another example, a time distribution of events of the cluster can be displayed in a plot to show different values over time.

As noted above, access nodes or client devices can be operated in a number of different deployment environments. For different deployment environments, certain parameters, such as placement density of access nodes, propagation characteristics of wireless signals, the number and type of devices, the traffic/application usage, and so forth, may vary. A device can thus be classified based on environmental dimensions.

Anomalies or failures may be related to the deployment environment and the impact metric for each event vector can be a function of the deployment environment. The environment class (which indicates the deployment environment) can be used as an additional dimension of each event vector.

When clustering events, a metric that can be used for determining relevance of an event is the time dimension. For example, an event that occurred recently likely would be more relevant to a user than an event occurring farther in the past. When determining the size of a cluster in forming clusters as part of the clustering of events to form clusters, a recent event can be assigned a greater weight than a less recent event. For example, a decaying exponential weight factor can be applied to events based on how far back in time an event occurred. A less recent event is assigned an exponentially decayed weight to place less importance on the less recent event. A weight assigned to an event can be based on $2^{-n}$, where n represents a unit of time from the present.

In further examples, the anomalous event aggregation process 500 can track (at 506) the evolution of each cluster over time. Each cluster can represent a signature of a respective issue.

If a cluster shrinks over time (to include fewer events than an original number of events in the cluster or to include less severe events than original events in the cluster), then that is an indication that an attempted remediation for an issue represented by the cluster is working. The severity of an event can be represented by how far out of range a parameter or set of parameters is from a specified range(s). By correlating the time when the remediation was applied (e.g., software update, configuration change, etc.) to the change in the cluster, the effectiveness of the remediation can be automatically measured, such as by an analysis system (in the form of a computer or multiple computers).

If a cluster grows over time (to include more events or more severe events), that is an indication that the underlying issue is getting worse. For example, a control process in a network may not be running in a stable manner, or an applied remediation is making the issue worse rather than better.

In response to the change, over time, of a characteristic of a given cluster, the anomalous event aggregation process 500 can generate an alert or generate a remediation to address an issue.

If a cluster splits into multiple clusters over time (such as based on the sub-clustering performed above), then that may indicate that the original issue was caused by multiple different root causes, which becomes evident over time as more examples of the issue are observed.

Various example techniques can be used to track clusters over time.

For example, clustering can be run independently for the events of each specified time interval (e.g., each day, each week, each hour, etc.), and then characteristics of clusters for the different time intervals can be compared using the inter-cluster metric noted above.

As another example, clustering can be run based on a sliding window of events. For example, a first clustering can be performed of events from January 1 to January 17, a second clustering can be performed of events from January 2 to January 18, and so forth. By checking which clusters the overlapping events (January 2 to January 17) belong to, a determination of a relationship between clusters for respective different sliding windows can be made. Clusters may evolve slightly each day.

In some examples, the anomalous event aggregation process 500 can receive (at 508) feedback from a human on an event aggregation signature (a description representing a characteristic of a cluster), a recommended next step, an identified root cause, or an identified remediation, and can provide this feedback to future event aggregations.

In an example, a cluster with a given description can be presented to a user. If the user chooses to reject the given description (maybe the cluster is not interesting to the user), an importance metric associated with the cluster can be reduced when compared to other clusters in the future. If the user takes an action based on a recommendation (or next steps) for the cluster, and the feedback is positive, the importance metric for the cluster can be increased in future recommendations.

The anomalous event aggregation process 500 can also correlate (at 510) event aggregations across similar environments, and can propagate recommended next step, root cause, or remediation for the similar environments. If a cluster with a recommended next step, root cause, or remediation has been successfully addressed for a first network, the suggestion accuracy weight can be increased for suggesting the same remediation for a similar environment (e.g., if a recommended remediation for an access node in an auditorium to fix an issue was successful, then the same recommendation can be made for other deployments with a similar access node deployment environment facing a similar issue).

The anomalous event aggregation process 500 can also use (at 514) an event aggregation purity metric in deciding which dimension is more relevant for a cluster description, a next step, a root cause, or a remediation. If a given dimension has a high percentage of events or a high percentage of events relative to the universal population, this dimension is considered "pure." For example if there are 23 channels to choose from, but 98% of the events in a cluster are in a particular channel, then the dimension relating to channels is considered "pure." This dimension can be likely used in determining recommendations for cluster descriptions, next steps, root causes, or remediation for further clusters.

Figure 6:
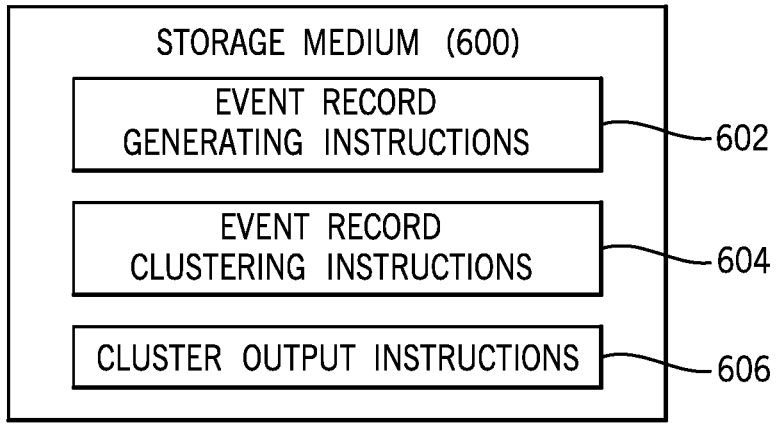
FIG. 6 is a block diagram of a storage medium storing machine-readable instructions, according to further examples.

FIG. 6 is a block diagram of a non-transitory machine-readable or computer-readable storage medium 600 storing machine-readable instructions that upon execution cause a system to perform various tasks. The machine-readable instructions include event record generating instructions 602 to generate event records representing anomalous events associated with respective devices in a network, each respective anomalous event of the anomalous events being identified as anomalous for a respective context of a device of the devices. The machine-readable instructions include event record clustering instructions 604 to cluster the event records to produce a plurality of clusters of the event records. The machine-readable instructions include cluster output instructions 606 to output the plurality of clusters for application of a remediation of an issue in the network.

Figure 7:
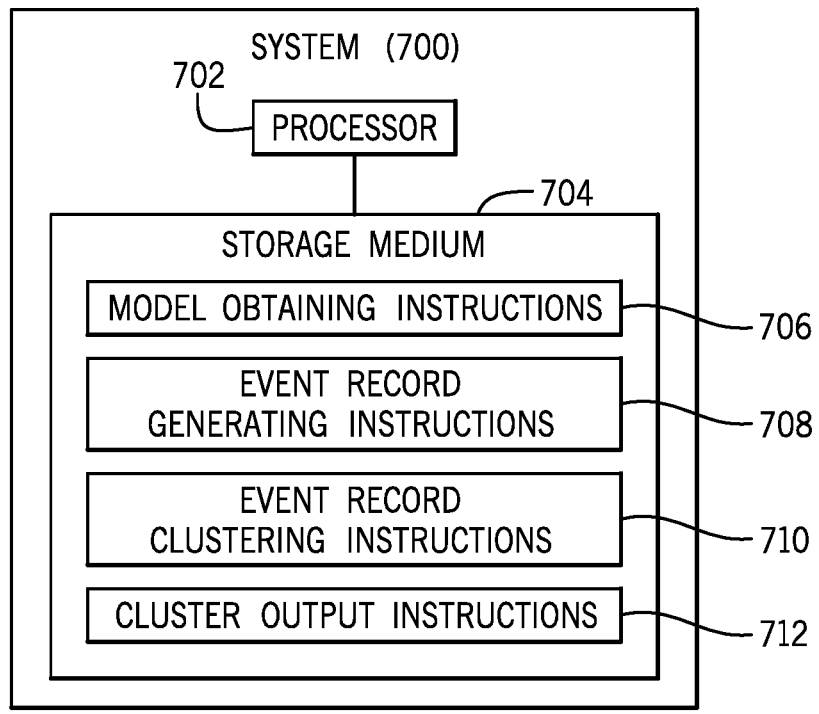
FIG. 7 is a block diagram of a system according to additional examples.

FIG. 7 is a block diagram of a system 700 including a processor 702 (or multiple processors) and a non-transitory storage medium 704 storing machine-readable instructions executable on the processor 702 to perform various tasks. A processor can include a microprocessor, a core of a multi-core microprocessor, a microcontroller, a programmable integrated circuit, a programmable gate array, or another hardware processing circuit. The machine-readable instructions include model obtaining instructions 706 to obtain models representing respective different contexts of devices in a network. The machine-readable instructions further include event record generating instructions 708 to generate event records representing anomalous events associated with respective devices in the network, each respective anomalous event of the anomalous events being identified as anomalous based on a respective model of the models. The machine-readable instructions further include event record clustering instructions 710 to cluster the event records to produce a plurality of clusters of the event records. The machine-readable instructions also include cluster output instructions 712 to output the plurality of clusters for application of a remediation of an issue in the network.

Figure 8:
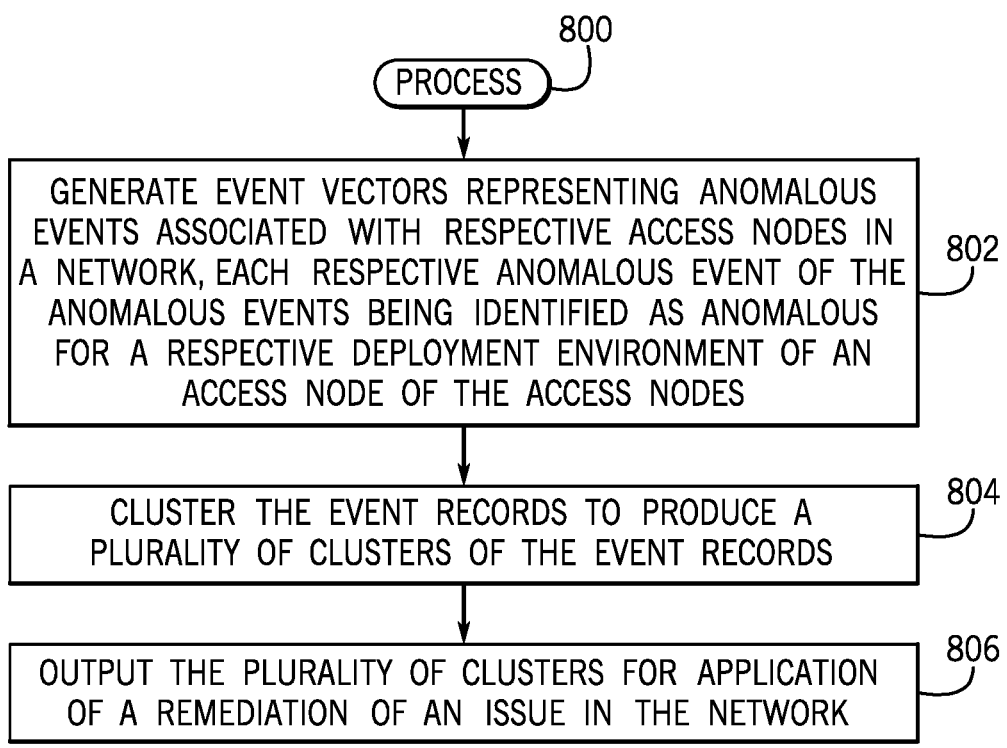
FIG. 8 is a flow diagram of a process according to alternative examples.

FIG. 8 is a flow diagram of a process 800 performed by a system, such as the anomalous event aggregation engine 112 of FIG. 1. The process 800 includes generating (at 802) event vectors representing anomalous events associated with respective access nodes in a network, each respective anomalous event of the anomalous events being identified as anomalous for a respective deployment environment of an access node of the access nodes. The process 800 further includes clustering (at 804) the event records to produce a plurality of clusters of the event records. The process 800 further includes outputting (at 806) the plurality of clusters for application of a remediation of an issue in the network.

The storage medium 600 (FIG. 6) and 704 (FIG. 7) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium storing instructions that upon execution cause a system to:
generate event records representing anomalous events associated with respective devices in a network, each respective anomalous event of the anomalous events being identified as anomalous for a respective context of a device of the devices;
cluster the event records to produce a plurality of clusters of the event records, wherein a given cluster of the plurality of clusters produced by the clustering of the event records includes event records that share similar values of a subset of dimensions of the event records in the given cluster, the shared similar values of the subset of dimensions indicating a characteristic of the given cluster;
output the plurality of clusters for application of a remediation of an issue in the network;
determine a change, over time, of a characteristic of a given cluster of the plurality of clusters; and
based on the change, over time, of the characteristic of the given cluster, determine whether the remediation applied to the issue in the network is effective.

2. The non-transitory machine-readable storage medium of claim 1, wherein the respective context of the device comprises a deployment environment of the device.

3. The non-transitory machine-readable storage medium of claim 1, wherein the respective context of the device comprises a setting of the device.

4. The non-transitory machine-readable storage medium of claim 1, wherein the respective context of the device is based on a type of the device.

5. The non-transitory machine-readable storage medium of claim 1, wherein the clustering of the event records produces the plurality of clusters according to a criterion specifying a size each cluster of the plurality of clusters.

6. The non-transitory machine-readable storage medium of claim 1, wherein the clustering of the event records produces the plurality of clusters each including event records representing events exhibiting a respective pattern, and excluding uncorrelated events.

7. The non-transitory machine-readable storage medium of claim 1, wherein each event record comprises an event vector including a plurality of dimensions extracted from information relating to respective events.

8. The non-transitory machine-readable storage medium of claim 1, wherein the instructions upon execution cause the system to:
rank the plurality of clusters according to a ranking criterion; and
cause display of the plurality of clusters according to the ranking of the plurality of clusters.

9. The non-transitory machine-readable storage medium of claim 8, wherein the instructions upon execution cause the system to:
generate a measure of similarity of event records in a given cluster of the plurality of clusters,
wherein the ranking is based on the measure.

10. The non-transitory machine-readable storage medium of claim 1, wherein the instructions upon execution cause the system to:
generate measures of similarity between clusters of the plurality of clusters; and
determine, based on the measures, which of the plurality of clusters are different from other clusters.

11. The non-transitory machine-readable storage medium of claim 1, wherein the change, over time, of the characteristic of the given cluster comprises a change of a size or impact of the given cluster over time.

12. The non-transitory machine-readable storage medium of claim 1, wherein the instructions upon execution cause the system to:
based on the change, over time, of the characteristic of the given cluster, generate an alert or generate a remediation.

13. The non-transitory machine-readable storage medium of claim 1, wherein the determining of the change, over time, of the characteristic of the given cluster comprises:
clustering event records at different time points to produce respective collections of clusters of event records at the different time points; and
comparing characteristics of different instances of the given cluster in the respective collections of clusters of event records at the different time points.

14. The non-transitory machine-readable storage medium of claim 1, wherein each event record includes a plurality of dimensions extracted from information relating to respective events, and wherein the instructions upon execution cause the system to:
obtain additional dimensions of the event records in a given cluster of the plurality of clusters;
based on the additional dimensions, split the given cluster into multiple sub-clusters; and
determine, based on the splitting of the given cluster into the multiple sub-clusters, that the issue in the network is due to multiple root causes.

15. The non-transitory machine-readable storage medium of claim 1, wherein the instructions upon execution cause the system to:
produce models representing respective different contexts of the devices,
wherein a given anomalous event of the anomalous events is identified as anomalous for a respective context of a device of the devices based on a corresponding model of the models.

16. A system comprising:
a processor; and a non-transitory storage medium storing instructions executable on the processor to:
obtain models representing respective different contexts of devices in a network;
generate event records representing anomalous events associated with respective devices in the network, each respective anomalous event of the anomalous events being identified as anomalous based on a respective model of the models;
cluster the event records to produce a plurality of clusters of the event records;
output the plurality of clusters for application of a remediation of an issue in the network;
determine a change, over time, of a characteristic of a given cluster of the plurality of clusters, the change comprising a reduction in size of the given cluster to include fewer events than originally included in the given cluster or a reduction in severity of events included in the given cluster than severity of events originally included in the given cluster; and
based on the change, over time, of the characteristic of the given cluster, determine that the remediation applied to the issue in the network is effective.

17. The system of claim 16, each event record of the event records includes a plurality of dimensions, wherein a dimension of the plurality of dimensions represents a model representing a deployment environment of an access node, and wherein the instructions are executable on the processor to:
determine, based on the plurality of clusters, that a model of the models is inaccurate.

18. A method executed by a system comprising a processor, comprising:
generating event vectors representing anomalous events associated with respective access nodes in a network, each respective anomalous event of the anomalous events being identified as anomalous for a respective deployment environment of an access node of the access nodes;
clustering the event records to produce a plurality of clusters of the event records;
outputting the plurality of clusters for application of a remediation of an issue in the network;
determining a change, over time, of a characteristic of a given cluster of the plurality of clusters, the change comprising a reduction in size of the given cluster to include fewer events than originally included in the given cluster or a reduction in severity of events included in the given cluster than severity of events originally included in the given cluster; and
based on the change, over time, of the characteristic of the given cluster, determining that the remediation applied to the issue in the network is effective.

19. The method of claim 18, further comprising:
determining a description for a given cluster of the plurality of clusters, based on values of a subset of dimensions of the event vectors in the given cluster; and
causing display, in a user interface, of the description for the given cluster.

* * * * *